(12) United States Patent
Kitchener

(10) Patent No.: US 10,464,010 B2
(45) Date of Patent: Nov. 5, 2019

(54) METHOD AND APPARATUS FOR COMPRESSING AND DRYING A GAS

(71) Applicant: ATELIERS FRANÇOIS, Liege (BE)

(72) Inventor: Anthony John Kitchener, South Melbourne (AU)

(73) Assignee: ATELIERS FRANCOIS, Liege (BE)

( * ) Notice: Subject to any disclaimer, the term of this patent is extended or adjusted under 35 U.S.C. 154(b) by 142 days.

(21) Appl. No.: 15/738,492

(22) PCT Filed: Jun. 22, 2016

(86) PCT No.: PCT/EP2016/064455
§ 371 (c)(1),
(2) Date: Dec. 20, 2017

(87) PCT Pub. No.: WO2016/207237
PCT Pub. Date: Dec. 29, 2016

(65) Prior Publication Data
US 2018/0185780 A1      Jul. 5, 2018

(30) Foreign Application Priority Data

Jun. 25, 2015  (EP) ..................... 15173873

(51) Int. Cl.
*B01D 53/047* (2006.01)
*B01D 53/26* (2006.01)

(52) U.S. Cl.
CPC ......... *B01D 53/047* (2013.01); *B01D 53/261* (2013.01); *B01D 2253/104* (2013.01); *B01D 2253/108* (2013.01); *B01D 2257/80* (2013.01); *B01D 2259/402* (2013.01)

(58) Field of Classification Search
CPC .... B01D 53/04; B01D 53/047; B01D 53/261; B01D 2253/104; B01D 2253/108; B01D 2257/80; B01D 2259/40052; B01D 2259/402
USPC ........ 95/90, 96, 117, 121, 122, 123; 96/121, 96/154; 34/80, 472, 473
See application file for complete search history.

(56) References Cited

U.S. PATENT DOCUMENTS

| | | | |
|---|---|---|---|
| 6,171,377 B1 * | 1/2001 | Henderson | ............. B01D 53/04 96/122 |
| 6,221,130 B1 | 4/2001 | Kolodziej et al. | |
| 7,250,150 B1 | 7/2007 | Keefer et al. | |
| 8,951,339 B2 * | 2/2015 | Henderson | ............. F16K 49/00 417/43 |
| 9,186,623 B2 * | 11/2015 | Gitschlag | ............. B01D 53/261 |
| 2005/0199124 A1 | 9/2005 | Little et al. | |
| 2007/0295205 A1 * | 12/2007 | Vertriest | ............. B01D 53/261 95/41 |
| 2012/0222549 A1 * | 9/2012 | Vermeer | ............. B01D 53/261 95/41 |
| 2014/0190349 A1 | 7/2014 | Inui et al. | |
| 2018/0154302 A1 * | 6/2018 | Vertriest | ............. B01D 53/06 |

FOREIGN PATENT DOCUMENTS

EP           079635 A1     10/1997

* cited by examiner

*Primary Examiner* — Frank M Lawrence, Jr.
(74) *Attorney, Agent, or Firm* — Norris McLaughlin, P.A.

(57) ABSTRACT

An apparatus and a method for compressing and drying a gas and for delivering dried gas at a high pressure greater than 10 bar and a flow rate greater than 1 m3/min and up to 100 m3/min.

10 Claims, 6 Drawing Sheets

METHOD AND APPARATUS FOR COMPRESSING AND DRYING A GAS

Figure 1:
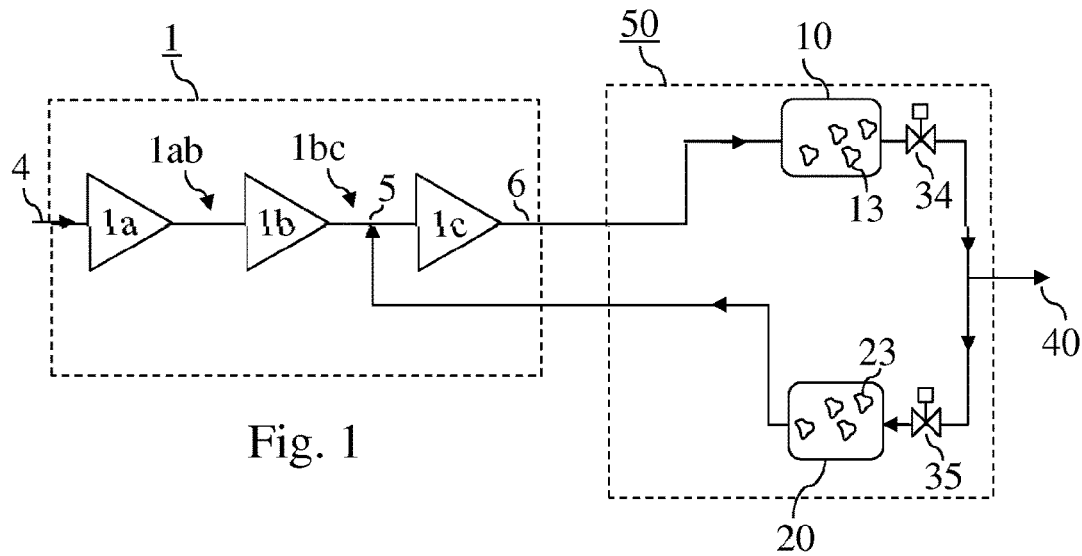

This application is a 371 application of PCT/EP2016/064455 filed 22 Jun. 2016, which claims foreign priority benefit under 35 U.S.C. § 119 of European application 15173873.9 filed 25 Jun. 2015.

FIELD OF THE INVENTION

The invention relates to an apparatus and a method for compressing and drying a gas. The invention more particularly relates to an apparatus and a method for delivering to a user, a dried gas at a high pressure and at a high flow rate, such as for example a pressure greater than 10 bar and a flow rate greater than 1 m$^3$/min and up to 100 m$^3$/min.

DESCRIPTION OF PRIOR ART

Gas compressors of many types are known in the art. It is also known that compressed gas, particularly compressed air, has a relatively high moisture content when leaving the compressor and that such moisture content should be removed or at least reduced before delivery of the compressed gas to a user.

Several methods have been proposed for drying a compressed gas.

A know method consists in cooling the compressed gas so that its water vapour content condenses, after which the liquid water is purged. Generally, the dried gas must thereafter be heated again in order to reach a temperature that is required for its future use. Though such dryers work well, they consume quite some energy and therefore reduce the total efficiency of the apparatus. It is not uncommon that such a refrigerated dryer consumes 3% to 5% of the total power consumption of the apparatus, particularly in case of a high pressure and high flow rate compressor such as a multistage compressor for example. Such refrigerated dryers further present many other disadvantages: they are very delicate to transport, they require a specific electric power supply and specific water cooling conduits, they need to be monitored and refilled with refrigerant which must satisfy stringent and variable regulatory requirements in various countries, etc.

Another known method consists in adsorbing the water vapour of the compressed gas on a desiccant. In such desiccant dryers, the desiccant must however be regenerated or replaced when it is saturated with moisture. Two conventional methods for regenerating a saturated desiccant are the Thermal Swing Adsorption (TSA) method and the Pressure Swing Adsorption (PSA) method.

With the TSA method, the desiccant is regenerated by heating it up to high temperatures, typically over 120° C., which causes desorption of the previously adsorbed moisture. After this step, the desiccant must be cooled down, preferably with dry cooling air, in order to be able to efficiently adsorb the water vapour again from the humid compressed gas.

Such a method is for example known from U.S. Pat. No. 6,221,130. Here, the desiccant to be regenerated is placed in the gas flow of an interstage of a multistage compressor and the heat of this interstage gas is used to desorb the moisture previously adsorbed from the compressor output.

Such method has the disadvantage that it uses relatively humid air for the regeneration process, which impairs on the efficiency of this process.

The efficiency of this process furthermore depends on the temperature of the interstage compressed gas, which parameter can generally not be freely chosen because it depends on the compression process. Compared to the PSA method, which will be detailed hereafter, the TSA method is also much slower because of the time needed to heat up and then cool down the desiccant at each regeneration cycle. As a further negative consequence of this, TSA vessels which hold the desiccant must be large and when there are large vessels that must withstand high pressure they need thick walls and are very expensive to manufacture.

A compressor using a TSA dryer is also known from European patent publication EP799635. Here, relatively dry gas from the compressor's output is used for the regeneration of the saturated desiccant after this gas has been first heated up by using the compression heat generated by the compressor. Apart from the advantage of using relatively dry gas for the regeneration, this method suffers of the same disadvantages as the previous one.

A compressor using a TSA dryer is also known from US patent publication US2014/0190349. Here gas from an intermediate stage of the compressor is dried by a TSA dryer before a part of it is fed to a next compressor stage.

Another part of the intermediate dried gas is used for the regeneration of the saturated desiccant of the TSA drier after this gas has been first heated up by a regenerative gas heater. This device therefore suffers of the same disadvantages as the previous one. It is further to be noted that there is no drying of the gas output by the final compressor stage, which may result in an output gas which has too much moisture content.

The PSA method does not use changes in temperature but rather changes in pressure in order to release the adsorbed moisture. Typically, a desiccant adsorbs the moisture at an elevated pressure. The process then swings to a lower pressure—typically atmospheric pressure—in order to desorb the adsorbed moisture from the desiccant. Adsorption and desorption may operate at near-ambient temperature and do neither need external heating nor cooling, which is an advantage over the TSA process. The PSA method presents however the disadvantage that a part of the compressed gas is lost in the course of the regeneration cycle. PSA is furthermore known in the art not to be suitable for drying gases at high pressures and/or high flow rates.

SUMMARY OF THE INVENTION

It is an object of the invention to provide a method and an apparatus for compressing and drying a gas which addresses the problems of the state of the art methods and apparatus. It is more particularly an object of the invention to provide a method and an apparatus for delivering a dried gas at a high pressure and at a high flow rate, such as for example a pressure greater than 10 bar and a flow rate greater than 1 m$^3$/min and up to 100 m$^3$/min.

The invention is defined by the independent claims. The dependent claims define advantageous embodiments.

According to the invention, there is provided a method for compressing and drying a gas, said method comprising the steps of:

compressing the gas in a multistage compressor having at least three successive compressor stages, a first stage gas inlet, a final stage gas outlet delivering a final stage compressed gas, a first interstage portion operating at a first intermediate pressure and a second interstage portion operating at a second intermediate pressure which is greater than the first intermediate pressure, drying the final stage compressed gas by feeding it into a first chamber comprising a first regenerable adsorbent, said first chamber delivering a dried gas at a dried gas outlet for a user, regenerating a second regenerable adsorbent contained in a second chamber by feeding said second chamber with a part of the dried gas from the dried gas outlet and by venting the second chamber in two sequential sub-steps: a first sub-step wherein the second chamber is vented into a second interstage gas inlet of the second interstage portion, and a second sub-step wherein the second chamber is vented into the first interstage gas inlet of the first interstage portion.

This method is different from the refrigeration method and from the TSA method and hence it doesn't show the aforementioned disadvantages of these methods. The method according to the invention does use the PSA method in a new and specific way, namely by venting the regeneration sequentially into different interstages of the multistage compressor (initially to a second intermediate pressure and then to a first intermediate pressure which is lower than the first intermediate pressure), so that one avoids too high and/or negative pressure differences during venting and so that the compressed gas used to this end is not wasted to the atmosphere but is re-introduced in the compressor, which results in a better total efficiency of the apparatus compared to the existing methods.

In a preferred method according to the invention, the first and second chambers are mutually swapped in a periodical manner so that the step of drying the final stage compressed gas occurs during a first period of time in the first chamber while the step of regenerating the second regenerable adsorbent occurs in the second chamber, and vice versa during a second period of time.

Apart from the time needed to swap the first and second chambers, this allows to almost continuously deliver compressed and dried gas to a user.

More preferably, the step of compressing the gas is a step of compressing the gas to a final stage outlet pressure which is greater than 10 bar, preferably greater than 20 bar, more preferably greater than 30 bar.

In each and any of these cases, said gas is preferably air.

The invention also concerns an apparatus for implementing these methods.

SHORT DESCRIPTION OF THE DRAWINGS

Figure 2:
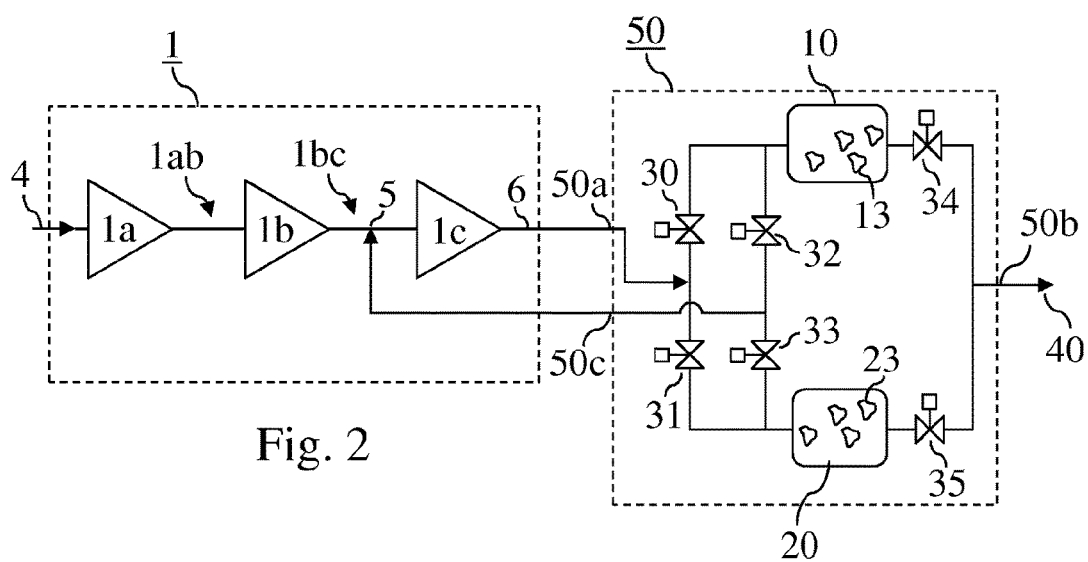
Figure 3:
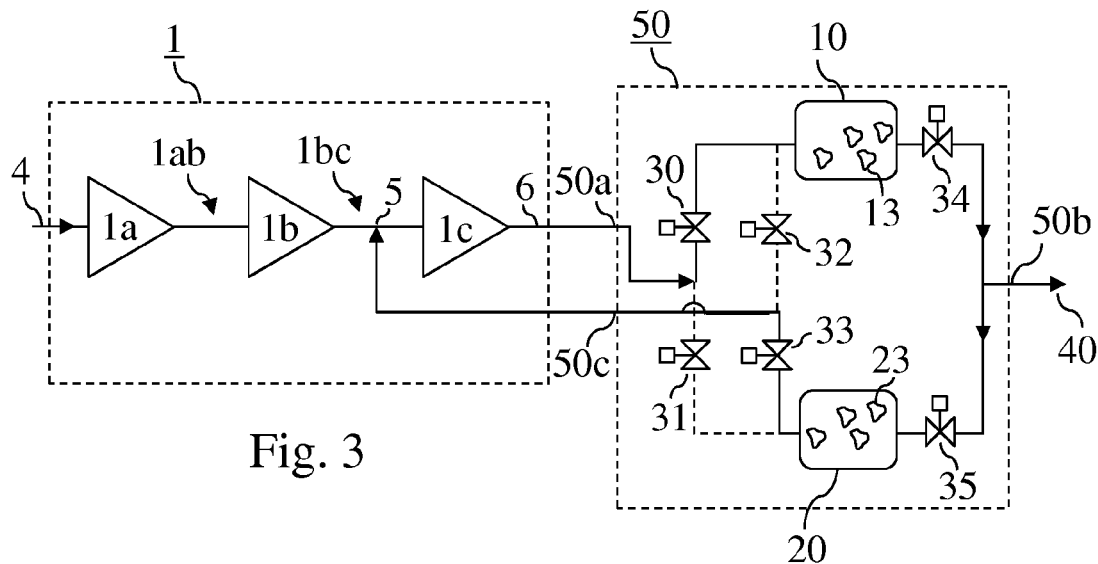
Figure 4:
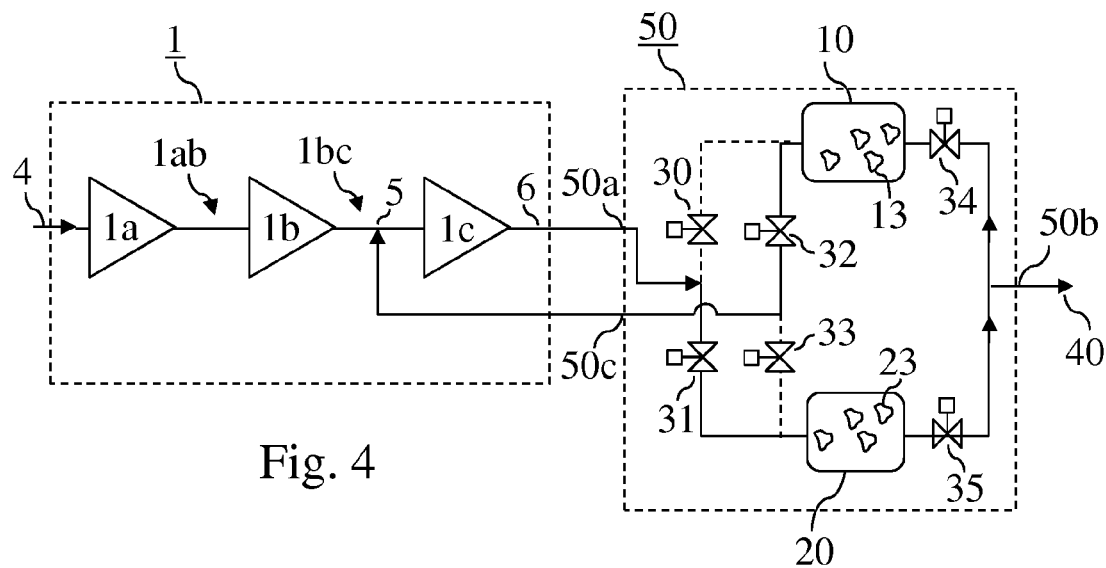
Figure 5:
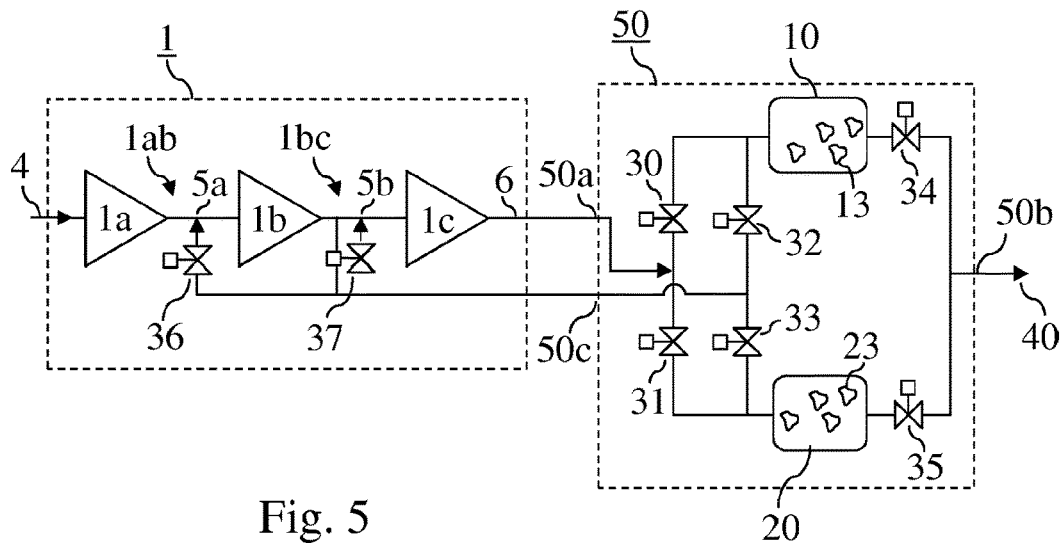
Figure 6:
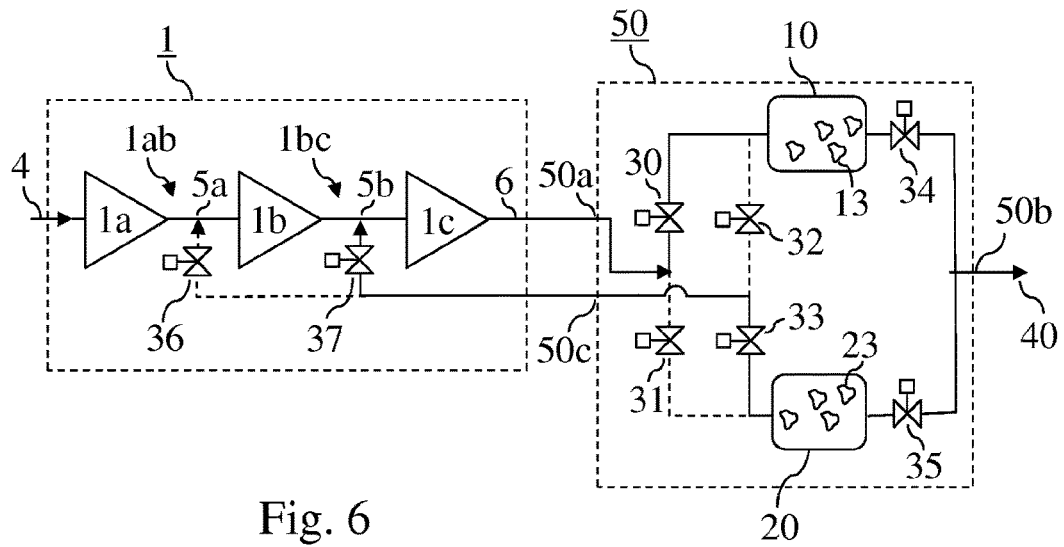
Figure 7:
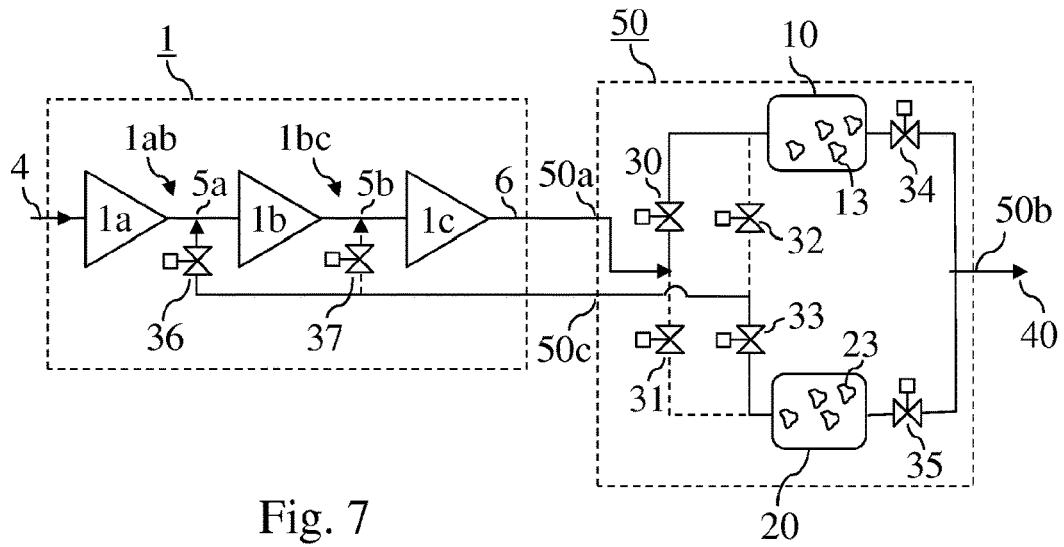
Figure 8:
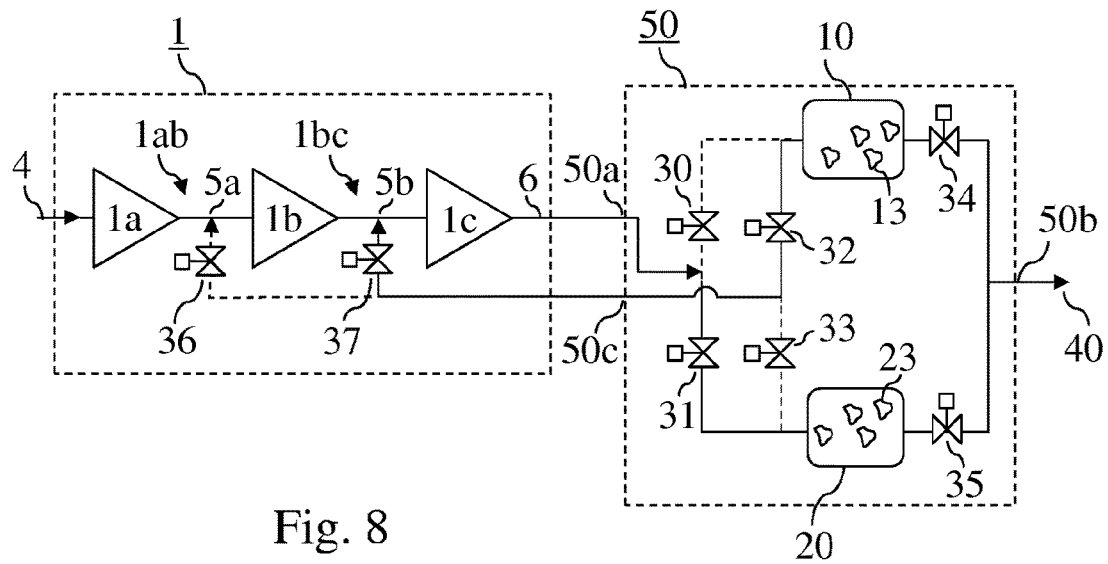
Figure 9:
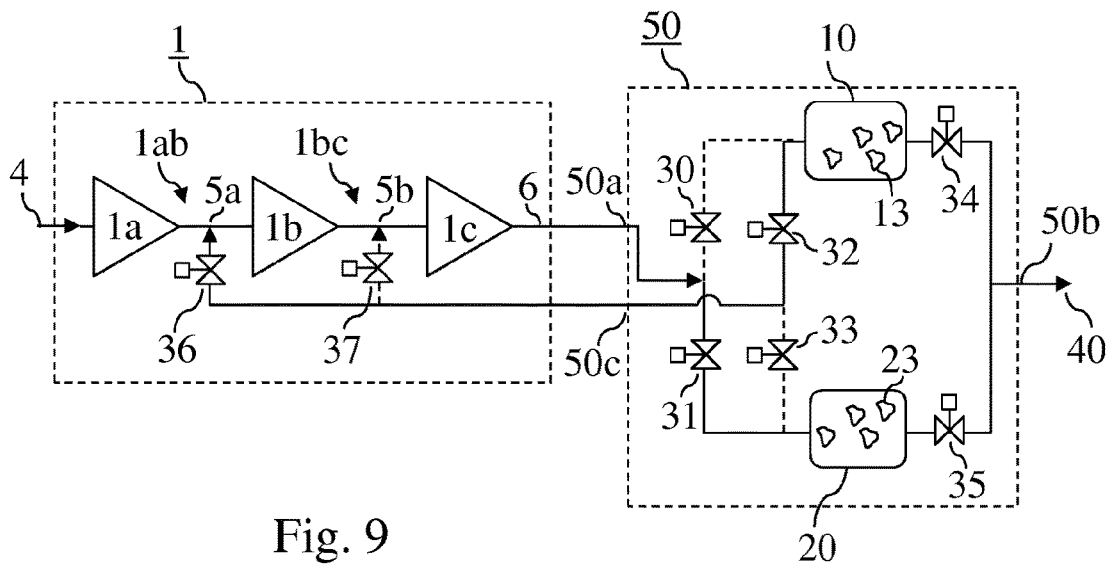

These and further aspects of the invention will be explained in greater detail by way of examples and with reference to the accompanying drawings in which:

FIG. 1 schematically shows an exemplary apparatus according to the invention;

FIG. 2 schematically shows an exemplary apparatus according to a preferred embodiment of the invention;

FIG. 3 schematically shows the apparatus of FIG. 2 when in a first phase of operation;

FIG. 4 schematically shows the apparatus of FIG. 2 when in a second phase of operation;

FIG. 5 schematically shows an exemplary apparatus according to a more preferred embodiment of the invention;

FIG. 6 schematically shows the apparatus of FIG. 5 when in a first phase of operation;

FIG. 7 schematically shows the apparatus of FIG. 5 when in a second phase of operation;

FIG. 8 schematically shows the apparatus of FIG. 5 when in a third phase of operation;

FIG. 9 schematically shows the apparatus of FIG. 5 when in a fourth phase of operation.

Figure 10:
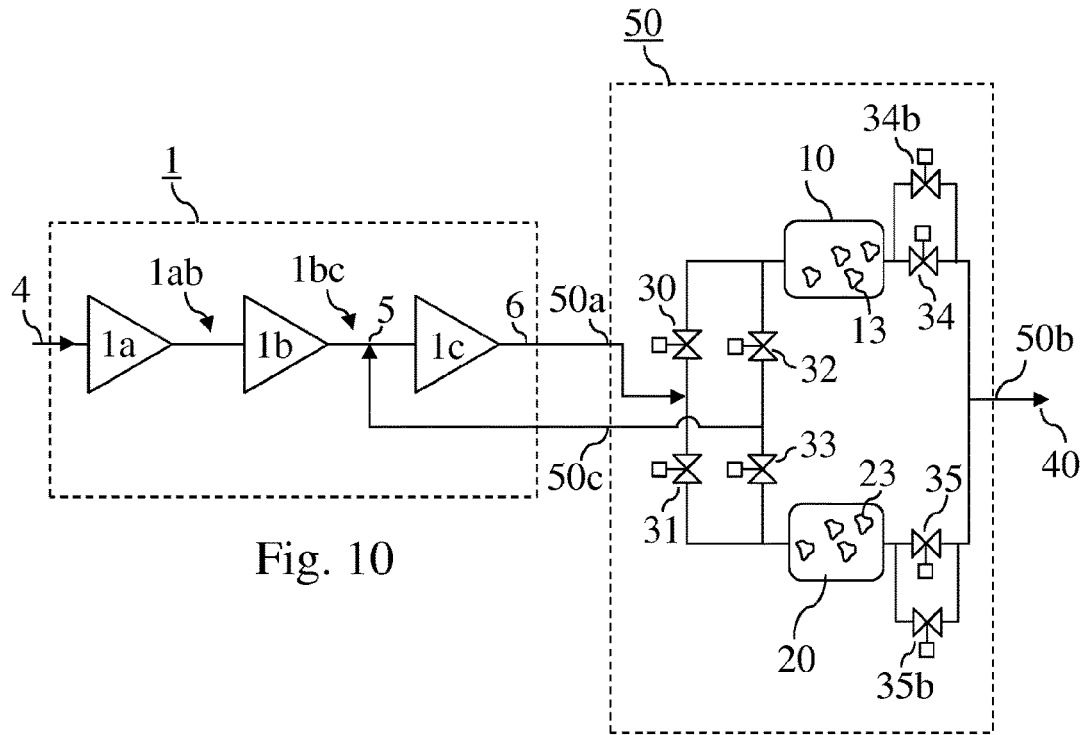

FIG. 10 schematically shows an exemplary apparatus according to an even more preferred embodiment of the invention.

Figure 11:
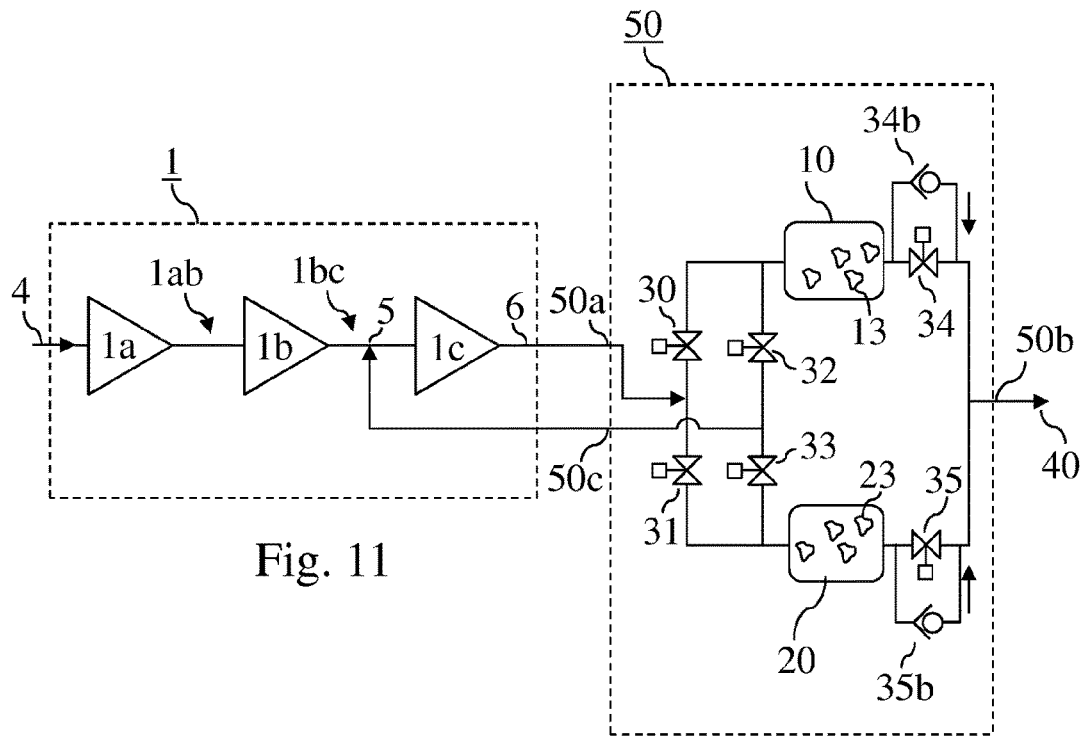

FIG. 11 schematically shows an exemplary apparatus according to an even more preferred embodiment of the invention.

Figure 12:
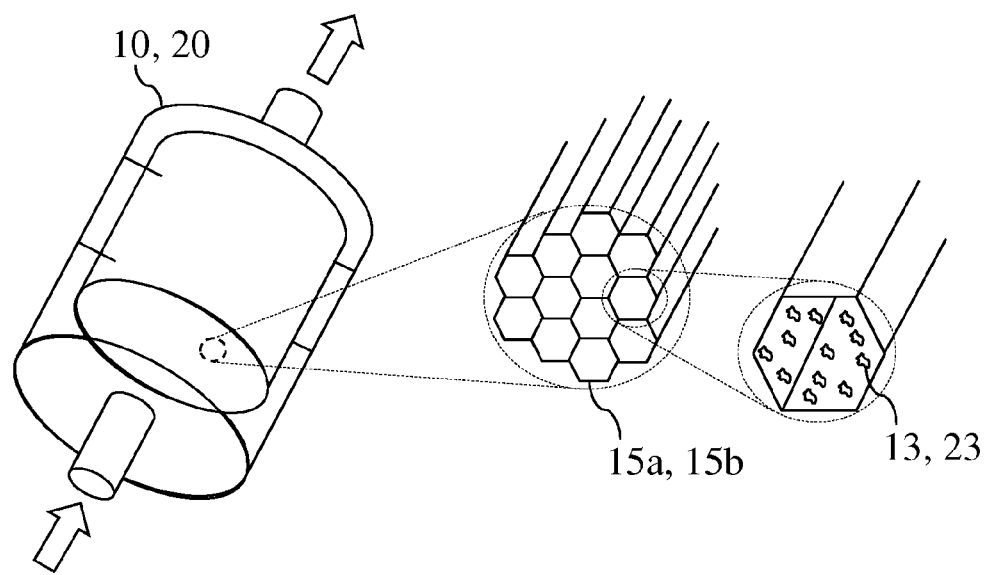

FIG. 12 schematically shows a part of an exemplary apparatus according to a preferred embodiment of the invention.

The drawings of the figures are neither drawn to scale nor proportioned. Generally, similar or identical components are denoted by the same reference numerals in the figures.

DETAILED DESCRIPTION OF EMBODIMENTS OF THE INVENTION

FIG. 1 schematically shows an exemplary apparatus according to the invention and comprising a multistage gas compressor (1) followed by a gas dryer or dehumidifier (50).

The multistage compressor may be any type of gas compressor. As is well known, a multistage compressor comprises interstage portions between any two adjacent compression stages, these interstage portions operating respectively at increasing intermediate pressures.

In the example illustrated in FIG. 1, the multistage compressor is a three stage compressor comprising, successively, a first stage (1a) having a first stage gas inlet (4) to which gas to be compressed is input, followed by a second stage (1b), followed by a third stage (1c) from which compressed gas is output at a final stage outlet (6). The compressor of FIG. 1 has a first interstage portion (1ab) located between the first and the second stage and operating at a first intermediate pressure, and a second interstage portion (1bc) located between the second and the third stage and operating at a second intermediate pressure which is greater than the first intermediate pressure. In this example, the second interstage portion (1bc) comprises an interstage gas inlet (5) to which gas can be supplied in addition to the gas flow coming from an upstream stage, as will be explained hereafter.

The apparatus further comprises a dryer (50) comprising a first chamber (10) including a first regenerable adsorbent (13) and a second chamber (20) including a second regenerable adsorbent (23). The regenerable adsorbents (13, 23) are those which are capable of adsorbing moisture from a gas, such as zeolites or activated alumina or silica gels for example.

As shown in FIG. 1, the apparatus also comprises a first valve (34) and a second valve (35), corresponding valve controls (not illustrated), and gas conduits, all configured for, in the course of a first period of time:

connecting the first chamber (10) in series between the final stage gas outlet (6) and a dried gas outlet (40) for a user, and for connecting the second chamber (20) in series between said dried gas outlet (40) and at least one of the at least one interstage gas inlet of the multistage compressor.

In this example, the second chamber (20) is connected in series between said dried gas outlet (40) and an interstage gas inlet (5) into the second interstage portion (1bc) of the multistage compressor, but it may as well be connected in series between said dried gas outlet (40) and an interstage gas inlet into the first interstage portion (1ab) of the multistage compressor.

With such a configuration, humid gas which is delivered by the final stage (1C) of the compressor may be dried by the first regenerable adsorbent of the first chamber (10) to deliver a dried gas to a user, while a part of said dried gas may be fed back into the second chamber (20) for regenerating the second regenerable adsorbent. A flow rate to the dried gas outlet may in this example be controlled by the first valve (34), while a flow rate of dried gas fed back into the second chamber (20) may be controlled by the second valve (35). Typically, 10% to 20% of the dried gas output by the first chamber (10) is fed into the second chamber (20) for regenerating the second regenerable adsorbent. Specific to the invention is that the gas which is output by the second chamber is not or not completely discharged into the atmosphere but is rather fed back at least partially into an interstage portion of the compressor.

In a method according to the invention, the following steps a), b) and c) are performed for compressing and drying a gas:
a) Compressing the gas in a multistage compressor having at least one interstage gas inlet (5) and having a final stage gas outlet (6) delivering a final stage compressed gas.
b) Drying the final stage compressed gas by feeding it into a first chamber (10) comprising a first regenerable adsorbent (13), said first chamber delivering a dried gas at a dried gas outlet (40) for a user.
c) Regenerating a second regenerable adsorbent (23) contained in a second chamber (20) by feeding said second chamber with a part of the dried gas from the dried gas outlet (40) and by venting the second chamber into at least one of the at least one interstage gas inlets (5).

It will be clear that such a method may for example be implemented with an apparatus as described hereinabove.

FIG. 2 schematically shows an exemplary apparatus according to a preferred embodiment of the invention.

This apparatus is identical to the apparatus of FIG. 1, except that its dryer (50) comprises four additional valves (30, 31, 32, 33), corresponding additional valve controls (not illustrated) and additional gas conduits, as illustrated. The first and second valves (34, 35), the four additional valves (30, 31, 32, 33), the corresponding valve controls, and the gas conduits, are furthermore all configured for, in the course of a second period of time:
  connecting the second chamber (20) in series between the final stage gas outlet (6) and a dried gas outlet (40) for a user, and for
  connecting the first chamber (10) in series between said dried gas outlet (40) and at least one of the at least one interstage gas inlet (5) of the multistage compressor.

Such a dryer (50) is sometimes called a Pressure Swing Adsorption (PSA) dryer and is well known in the art, for example from patent publication number U.S. Pat. No. 2,944,627 to Skarstrom, which is incorporated herein by reference.

As shown on FIG. 2 and subsequent figures, the dryer (50) has a humid gas inlet (50a), a dried gas outlet (50b) and a purge outlet (50c). The dryer (50) is controlled to operate as shown in more detail in FIG. 3 and FIG. 4.

FIG. 3 schematically shows the apparatus of FIG. 2 when in a first phase of operation during the first period of time. In this first phase of operation, the valve controls do at least partially open valves 30, 33, 34 and 35 and do close valves 31 and 32. As a consequence, humid gas which is delivered by the final stage (1c) of the compressor may be dried by the first regenerable adsorbent (13) of the first chamber (10) to deliver a dried gas (40) to a user, while a part of said dried gas may be fed back into the second chamber (20) for regenerating the second regenerable adsorbent (23). Specific to the invention is that the gas which is output by the second chamber (20) in the course of said first phase of operation is not or not completely discharged into the atmosphere but is rather fed back at least partially into an interstage portion (5) of the compressor.

FIG. 4 schematically shows the apparatus of FIG. 2 when in a second phase of operation during the second period of time. In this second phase of operation, the valve controls do at least partially open valves 31, 32, 34 and 35 and do close valves 30 and 33. As a consequence, humid gas which is delivered by the final stage (1c) of the compressor may be dried by the second regenerable adsorbent (23) of the second chamber (20) to deliver a dried gas (40) to a user, while a part of said dried gas may be fed back into the first chamber (10) for regenerating the first regenerable adsorbent (13). Specific to the invention is that the gas which is output by the first chamber in the course of the second phase of operation is not or not completely discharged into the atmosphere but is rather fed back at least partially into an interstage portion (5) of the compressor.

The valve controls may be configured for periodically switching the apparatus between the first and second phases of operation, thereby enabling an almost continuous delivery of dried compressed gas to the user at the dried gas outlet (40).

In a preferred method according to the invention, the first chamber (10) and the second chamber (20) are mutually swapped in a periodical manner so that the step of drying the final stage compressed gas occurs during a first period of time in the first chamber while the step of regenerating the second regenerable adsorbent occurs in the second chamber, and vice versa during a second period of time.

FIG. 5 schematically shows an exemplary apparatus according to a more preferred embodiment of the invention. This apparatus is identical to the apparatus of FIG. 2, except that it further comprises two venting valves (36, 37), corresponding venting valve controls (not illustrated) and venting gas conduits, as illustrated, which are all configured for, in the course of the first period of time:
  connecting the second chamber (20) in series between said dried gas outlet (40) and a second interstage gas inlet (5b) of the second interstage portion (1bc) during a third period of time, and for connecting the second chamber (20) in series between said dried gas outlet (40) and a first interstage gas inlet (5a) of the first interstage portion (1ab) during a fourth period of time following the third period of time.

First venting the second chamber into the second interstage portion (1bc) rather than into the first interstage portion (1ab) of the multistage compressor presents indeed the advantage to reduce the gas flow rate through the second chamber during this phase of operation, which reduces the risk of entraining adsorbent dust and/or to damage the adsorbent and which also reduces noise. It also facilitates the recompression of the vented gas by the compressor, which reduces energy losses and hence improves the overall efficiency.

FIG. 6 schematically shows the apparatus of FIG. 5 when in a first phase of operation during the first period of time.

In this first phase of operation, the valve controls do at least partially open valves 30, 33, 34, 35 and 37, and do close valves 31, 32 and 36 during the third period of time. Hence, the gas which is output by the second chamber (20) in the course of said first phase of operation is fed back at least partially into the second interstage portion (1bc) of the compressor via the second interstage gas inlet (5b). As a consequence, humid gas which is delivered by the final stage (1*c*) of the compressor may be dried by the first regenerable adsorbent (13) of the first chamber (10) to deliver a dried gas to a user, while a part of said dried gas may be fed back into the second chamber (20) for regenerating the second regenerable adsorbent (23). Hence, the gas which is output by the second chamber in the course of said first phase of operation is fed back at least partially into the second interstage portion (1*bc*) of the compressor via the second interstage gas inlet (5*b*).

FIG. 7 schematically shows the apparatus of FIG. 5 when in a second phase of operation during the first period of time.

In this second phase of operation, the valve controls do at least partially open (or let open) valves 30, 33, 34, 35 and 36, and do close (or let closed) valves 31, 32 and 37 during the fourth period of time. Hence, the gas which is output by the second chamber in the course of said second phase of operation is fed back at least partially into the first interstage portion (1*ab*) of the compressor via the first interstage gas inlet (5*a*).

FIG. 8 schematically shows the apparatus of FIG. 5 when in a third phase of operation during the second period of time.

In this third phase of operation, the valve controls do at least partially open valves 31, 32, 34, 35 and 37, and do close valves 30, 33 and 36 during a fifth period of time. Hence, the gas which is output by the first chamber (10) in the course of said third phase of operation is fed back at least partially into the second interstage portion (1*bc*) of the compressor via the second interstage gas inlet (5*b*).

FIG. 9 schematically shows the apparatus of FIG. 5 when in a fourth phase of operation during the second period of time.

In this fourth phase of operation, the valve controls do at least partially open (or let open) valves 31, 32, 34, 35 and 36, and do close (or let closed) valves 30, 33 and 37 during a sixth period of time following the fifth period of time. Hence, the gas which is output by the first chamber (10) in the course of said fourth phase of operation is fed back at least partially into the first interstage portion (1*ab*) of the compressor via the first interstage gas inlet (5*a*).

In a preferred method according to the invention, the step of venting the second chamber (20) comprises two sequential sub-steps: a first sub-step wherein the second chamber (20) is vented into one of a first interstage gas inlet (5*a*) of the first interstage portion (1*ab*) or in a second interstage gas inlet (5*b*) of the second interstage portion (1*bc*), and a second sub-step wherein the second chamber (20) is vented respectively into one of the second interstage gas inlet (5*b*) of the second interstage portion (1*bc*) or in the first interstage gas inlet (5*a*) of the first interstage portion (1*ab*).

More preferably, the second chamber (20) is vented into the second interstage gas inlet (5*b*) of the second interstage portion (1*bc*) during the first sub-step, and the second chamber (20) is vented into the first interstage gas inlet (5*a*) of the first interstage portion (1*ab*) during the second sub-step, said second sub-step occurring after the first sub-step.

Preferably, the step of venting the first chamber (10) during the second period of time comprises also two sequential sub-steps, a third sub-step wherein the first chamber (10) is vented into the second interstage gas inlet (5*b*) of the second interstage portion (1*bc*), and a fourth sub-step wherein the first chamber (10) is vented into the first interstage gas inlet (5*a*) of the first interstage portion (1*ab*), said fourth sub-step occurring after the third sub-step.

As said before, typically 10% to 20% of the dried gas output by the first chamber (10) is fed into the second chamber (20) for regenerating the second regenerable adsorbent during the first period of time (illustrated on FIGS. 3, 6, 7), and, reciprocally, typically 10% to 20% of the dried gas output by the second chamber (20) is fed into the first chamber (10) for regenerating the first regenerable adsorbent during the second period of time (illustrated on FIGS. 4, 8, 9). Hence, the first and second valves (34, 35) are configured and optionally controlled to achieve these flow rates.

Nevertheless, the apparatus preferably further comprises a first bypass valve (34*b*) which is fluidly connected in parallel with the first valve (34) and a second bypass valve (35*b*) which is fluidly connected in parallel with the second valve (35), as shown on FIG. 10. The first bypass valve (34*b*) is configured and optionally controlled to bypass the first valve (34) during the first period of time, and the second bypass valve (35*b*) is configured and optionally controlled to bypass the second valve (35) during the second period of time, so that enough dried gas can be delivered to the dried gas outlet (40) for the user during each of the first and second periods of time.

In case the first and second bypass valves (34*b*, 35*b*) are control valves, a controller opens the first bypass valve (34*b*) and closes the second bypass valve (35*b*) during the first period of time, and the controller closes the first bypass valve (34*b*) and opens the second bypass valve (35*b*) during the second period of time.

Alternatively, the first and second bypass valves (34*b*, 35*b*) may be one-way valves (also known as check valves), each being oriented in such a way that gas can flow through these bypass valves from respectively the first and the second chambers (10, 20) to the dried gas outlet (40) and not in the opposite direction. An exemplary embodiment is schematically shown on FIG. 11, where the one-way directions of gas flow through the one-way valves are indicated by arrows.

Preferably, the first and the second bypass valves are spring-loaded one-way valves.

Preferably, the step of compressing the gas is a step of compressing the gas to a final stage outlet (6) pressure which is greater than 10 bar, preferably greater than 20 bar, more preferably greater than 30 bar.

Accordingly, the multistage compressor of an apparatus according the invention is preferably adapted to compress gas to a final stage outlet pressure which is greater than 10 bar, preferably greater than 20 bar, more preferably greater than 30 bar.

Preferably, said gas is air, more preferably ambient air.

Preferably, the first regenerable adsorbent (13) is fixed onto a surface of a first rigid structure (15*a*), said first rigid structure being attached inside and to the first chamber (10), and the second regenerable adsorbent (23) is fixed onto a surface of a second rigid structure (15*b*), said second rigid structure being attached inside and to the second chamber (20). Contrary to the known use of adsorbent-coated granulates or grains in the chambers of PSA dryers, the inventor has found that such a rigid structure (15) is more appropriate for treating high pressure compressed gases (such as pressures greater than 10 bar) and/or high gas flow rates (such a flow rates greater than 1 $m^3$/min and up to 100 $m^3$/min for example) in a PSA dryer.

More preferably, each of the first (15*a*) and second (15*b*) rigid structures is a channelled honeycomb structure. FIG. 12 schematically shows an exemplary chamber—which may be any of the first chamber (10) and/or the second chamber (20)—including a channelled honeycomb structure (15*a*, 15*b*) which is arranged axially into and rigidly attached to the chamber. The chamber also has gas input and output ports, as indicated by arrows on FIG. 10. Preferably, the input and output ports are arranged axially.

The rigid structure itself may for example be made of glass-fibre reinforced cardboard or any other appropriate rigid material.

Each channel of the honeycomb structure is for example coated or impregnated on its inside and along its length with a regenerable adsorbent (13, 23), such as silica gel or zeolites or activated alumina.

With such rigid structures, the inventors have found that gas velocities into the chambers (10, 20) up to 3/10 m/s and even up to 5 m/s may be used without significant drawbacks. This is 5 to 10 times more than when using chambers filled with adsorbent-coated granulates, yet enabling to remove more than 90% of the moisture contained in the incoming gas.

In a more preferred embodiment of the apparatus, the first and second chambers (10, 20) are elongated chambers which are both arranged horizontally. Preferably, the gas flow into the first and second chambers is a substantially horizontal gas flow.

The present invention has been described in terms of specific embodiments, which are illustrative of the invention and not to be construed as limiting. More generally, it will be appreciated by persons skilled in the art that the present invention is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated.

Use of the article "a", "an" or "the" preceding an element does not exclude the presence of a plurality of such elements.

A method according to the invention may also be described as follows: a method whereby a gas is first compressed by a multistage compressor (1) and then dried by a pressure swing adsorber (50). The pressure swing adsorber comprises a first chamber (10) including a first adsorbent (13). This first chamber is fed with humid gas from an output of the last stage (1c) of the compressor and it delivers dried gas for a user. The pressure swing adsorber further comprises a second chamber (20) including a second adsorbent (23) which may previously have adsorbed moisture. In order to regenerate the second adsorbent and to desorb the moisture, a part of said dried gas is fed into the second chamber and the second chamber is vented sequentially into at least two different interstage gas inlets (5b, 5a) of the compressor instead of into the atmosphere, thereby avoiding too high pressure differences and improving the total efficiency of the method.

The invention claimed is:

1. A method for compressing and drying a gas, the method comprising:
   compressing the gas in a multistage compressor having at least three successive compressor stages, a first stage gas inlet, a final stage gas outlet delivering a final stage compressed gas, a first interstage portion operating at a first intermediate pressure and a second interstage portion operating at a second intermediate pressure which is greater than the first intermediate pressure,
   drying the final stage compressed gas by feeding it into a first chamber comprising a first regenerable adsorbent, said first chamber delivering a dried gas at a dried gas outlet for a user,
   regenerating a second regenerable adsorbent contained in a second chamber by feeding said second chamber with a part of the dried gas from the dried gas outlet and by venting the second chamber into a gas inlet of the multistage compressor, wherein the step of venting the second chamber comprises two sequential sub-steps: a first sub-step wherein the second chamber is vented into a second interstage gas inlet of the second interstage portion, and a second sub-step wherein the second chamber is vented into a first interstage gas inlet of the first interstage portion.

2. The method according to claim 1, wherein the first and second chambers are mutually swapped in a periodical manner so that the step of drying the final stage compressed gas occurs during a first period of time in the first chamber while the step of regenerating the second regenerable adsorbent occurs in the second chamber, and vice versa during a second period of time.

3. The method according to claim 2, wherein the step of compressing the gas is a step of compressing the gas to a final stage outlet pressure which is greater than 10 bar.

4. An apparatus for compressing and drying a gas, said apparatus comprising:
   a multistage compressor having at least three successive compressor stages, a first stage gas inlet, a final stage gas outlet for delivering a final stage compressed gas, a first interstage portion operating at a first intermediate pressure, and a second interstage portion operating at a second intermediate pressure which is greater than the first intermediate pressure,
   a dryer comprising a first chamber including a first regenerable adsorbent and a second chamber including a second regenerable adsorbent,
   a first valve and a second valve, corresponding valve controls, and gas conduits, all configured for, in the course of a first period of time:
   connecting the first chamber in series between the final stage gas outlet a dried gas outlet for a user, and for
   connecting the second chamber in series between said dried gas outlet and a gas inlet of the multistage compressor,
   wherein the apparatus further comprises two venting valves, corresponding venting valve controls and venting gas conduits, all configured for, in the course of the first period of time, connecting the second chamber in series between said dried gas outlet and a second interstage gas inlet of the second interstage position during a third period of time, and for connecting the second chamber in series between said dried gas outlet and a first interstage gas inlet of the first interstage portion during a fourth period of time following third period of time.

5. The apparatus according to claim 4, further comprising four additional valves, and in that the first valve, the second valve, the four additional valves, the two venting valves, the corresponding valve controls, and the gas conduits, are furthermore all configured for, in the course of a second period of time:
   connecting the second chamber in series between the final stage gas outlet and the dried gas outlet, and for
   connecting the first chamber in series between the dried gas outlet and the second interstage gas inlet of the second interstage portion during a fifth period of time, and for
   connecting the first chamber in series between the dried gas outlet and the first interstage gas inlet of the first interstage portion during a sixth period of time following the fifth period of time.

6. The apparatus according to claim 4, further comprising a first bypass valve fluidly connected in parallel with the first valve and a second bypass valve fluidly connected in parallel with the second valve.

7. The apparatus according to claim 6, wherein the first and the second bypass valves are one-way valves, each oriented in such a way that air can flow from respectively the first and the second chambers to the dried gas outlet.

8. The apparatus according to claim 4, wherein the multistage compressor is adapted to compress the gas to a final stage gas outlet pressure which is greater than 10 bar.

9. The apparatus according to claim 4, wherein the first regenerable adsorbent is fixed onto a surface of a first rigid structure, said first rigid structure being attached inside and to the first chamber, and in that in that the second regenerable adsorbent is fixed onto a surface of a second rigid structure, said second rigid structure being attached inside and to the second chamber.

10. The apparatus according to claim 9, wherein each of the first and second rigid structures is a channelled honeycomb structure.

\* \* \* \* \*